Oct. 12, 1943.  G. H. JOHNSON  2,331,695
TRANSMISSION AND CONTROL MECHANISM
Filed March 4, 1940   4 Sheets-Sheet 1
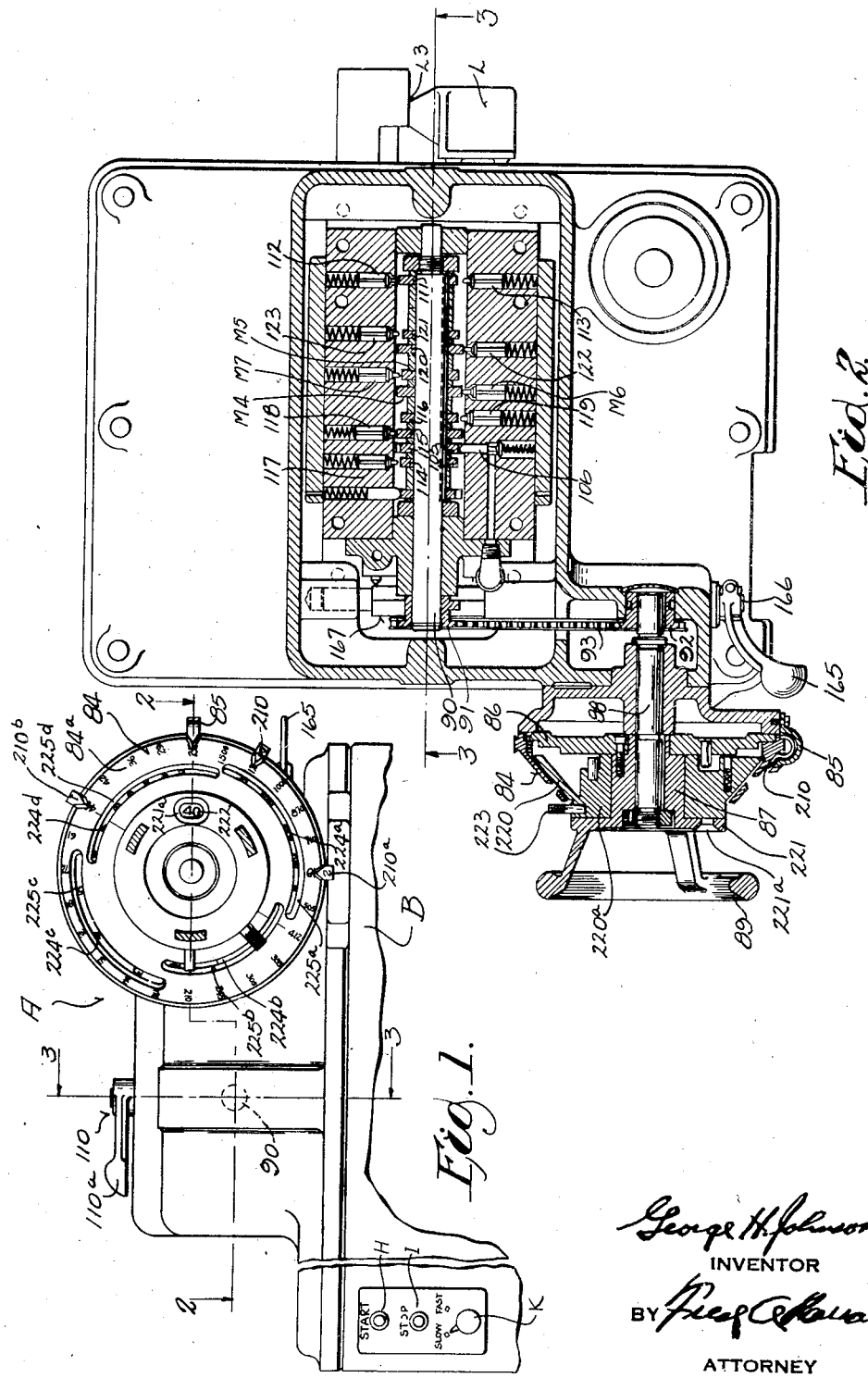

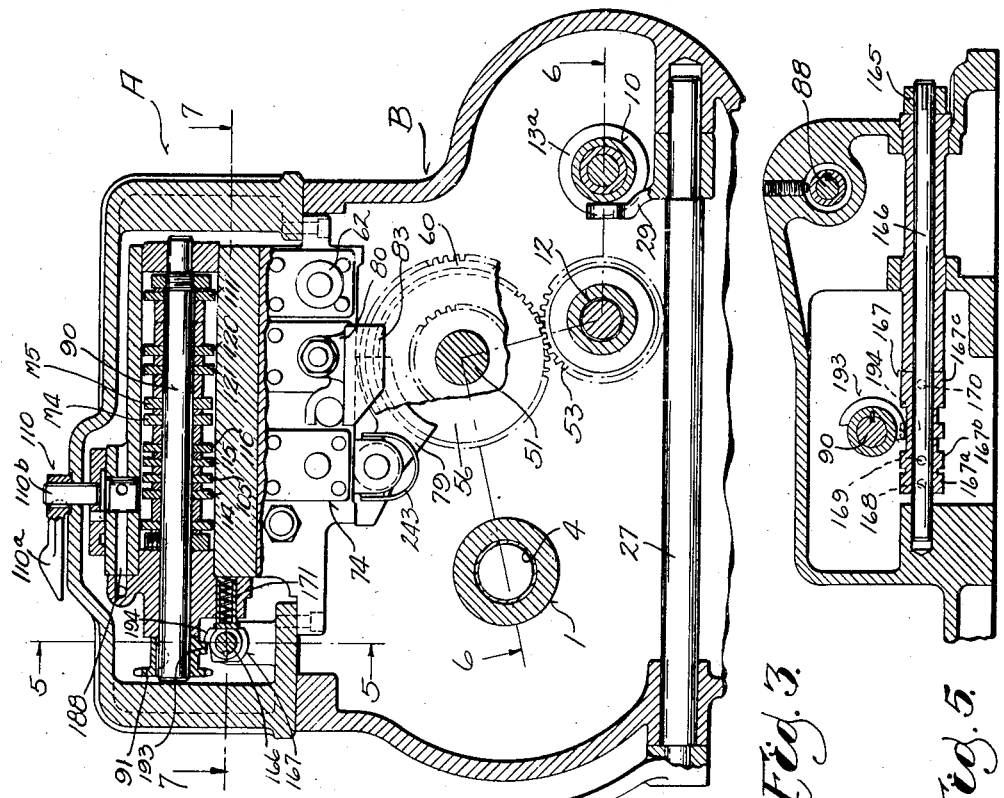
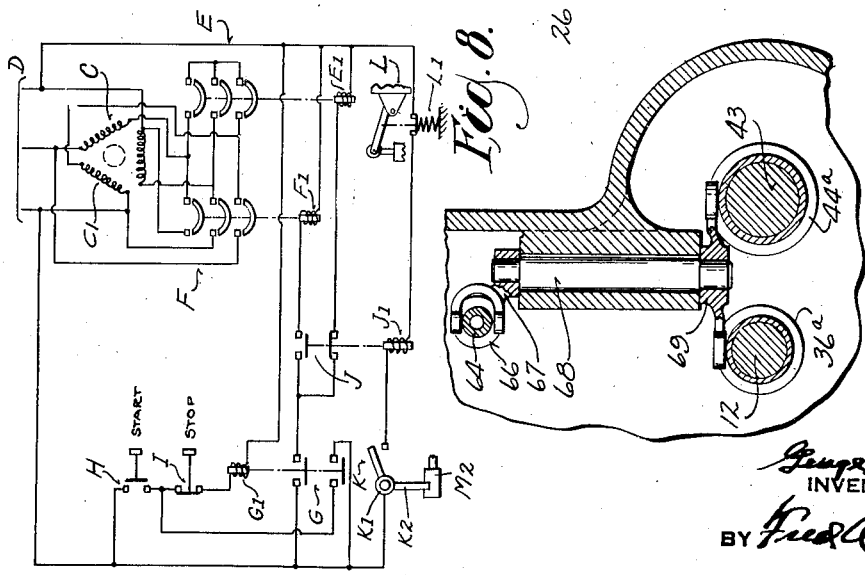

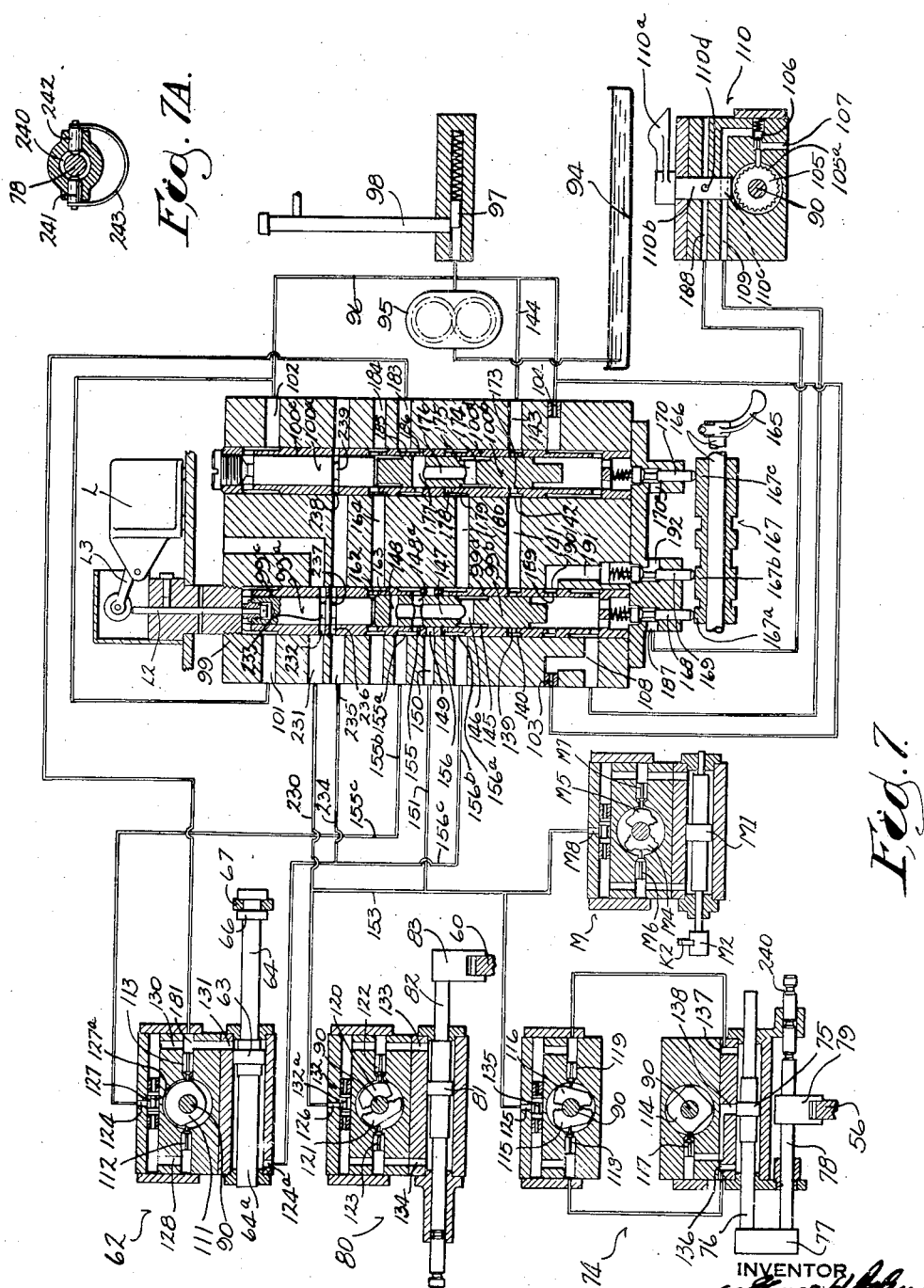

Patented Oct. 12, 1943

2,331,695

UNITED STATES PATENT OFFICE 2,331,695

TRANSMISSION AND CONTROL MECHANISM

George H. Johnson, Madison, Wis., assignor to Gisholt Machine Company, Madison, Wis., a corporation of Wisconsin Application March 4, 1940, Serial No. 322,080

22 Claims. (Cl. 74—472)

This invention relates to transmission and control mechanism, particularly for machine tools, and especially for the spindle drive of lathes and is, in part, intended to supplement and extend the utility of the invention disclosed in a co-pending application, Serial No. 300,139, filed October 19, 1939.

An object of the invention is to minimize the time, effort and attention required for the operator to effect the rate changes required in operation of a machine tool, particularly for change of rate as required between steps of successive operations for machining a work piece.

Another object is to effect a transmission and control organization selectively operable in different ways according to the nature of the operation or work piece whereby to operate the machine in each instance with maximum production and a minimum of operator's time, effort and attention, and particularly for lathes.

A further object is to provide improved control selective mechanism in a machine having several selectively available methods of control, and particularly to provide such mechanism organized for convenience and in such manner that the mechanism effecting one method of control does not set up undesired limitations on other available control methods.

A further object is to provide a rate change transmission and control organization adapted for rate changers providing for high output speeds, and particularly where the high speeds are included as a part of a range of output speeds also providing relatively low speeds.

A further purpose is to utilize an adjustable speed power source, such as a motor having a plurality of speeds, to increase the range of speeds otherwise available from a transmission, and to organize such power source and the control mechanism therefor with the other structure and control mechanism of the machine to effect increased utility for various of the other purposes mentioned and without setting up limitations therein.

A further purpose is generally to simplify and improve the construction, operation and structural relationship in a machine tool of rate change transmission and control mechanism, particularly in the matters previously mentioned, and especially for lathes or similar machines; and still other objects of the invention will be apparent from this specification.

The invention resides in the construction, arrangement and operation of parts as herein illustrated, described and claimed, but it will be understood that various modifications of the illustrated structure are contemplated, and that the invention includes all such modifications which are equivalent to or within the scope of the claims.

The same reference characters have been used to identify the same parts throughout, and in the drawings:

Figure 1 is a partial front elevation of a lathe in which the invention is incorporated, the portion shown being a speed controller device mounted on the upper part of the headstock or spindle end of the lathe, a portion of the speed controller device being broken away to more clearly show certain selector dials.

Figure 2 is a horizontal sectional view of the speed controller shown in Fig. 1, the section being taken approximately along line 2—2 of Fig. 1.

Figure 3 is a partial vertical transverse section taken approximately along line 3—3 of Fig. 1, and 3—3 of Fig. 2, and showing the relationship of the speed controller to a spindle transmission of the lathe.

Figure 4 is a partial transverse vertical section, similar to Fig. 3, but taken at a plane to the right of line 3—3, Fig. 1, approximately as indicated by line 4—4 of Fig. 6.

Figure 5 is a transverse vertical section taken approximately along lines 5—5 of Fig. 3.

Figure 7 shows a section through certain control valves and associated parts, approximately along line 7—7 of Fig. 3 and somewhat enlarged, and also shows the inter-connection of the valves with other elements of the control mechanism, most of the other elements being shown diagrammatically and in reduced scale.

Figure 7A is a vertical section of detent mechanism for certain control rods.

Figure 8 is a diagram of certain electric control mechanism of the machine, and indicating certain interconnections thereof with other control mechanism, particularly that of Fig. 7.

Figure 6:
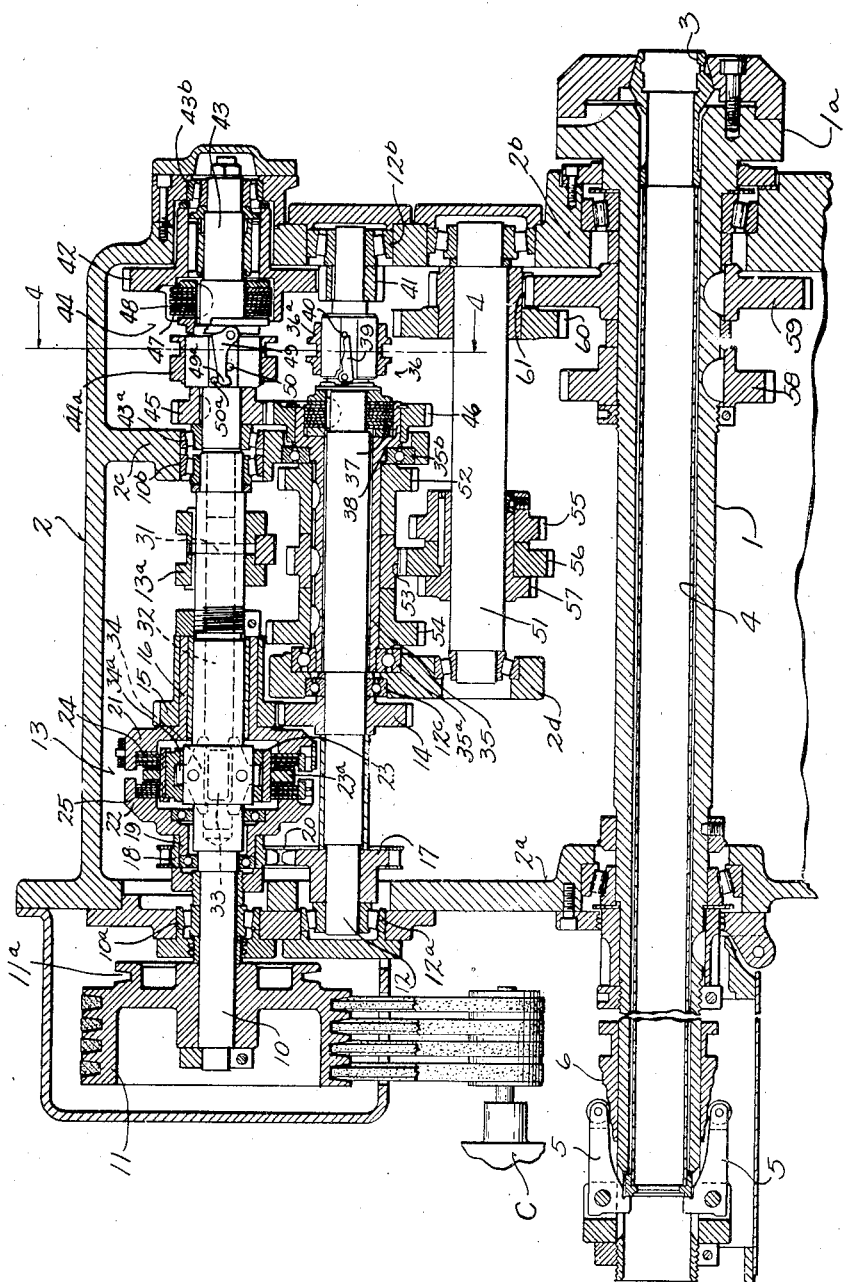
Figure 6 is a sectional development of a spindle transmission, and certain associated parts, of the lathe shown in Fig. 1, the development being taken along line 6—6 of Fig. 3.

The lathe here shown comprises a control unit A, Figs. 1, 3, and a support including a bed, not shown, and the headstock of which a portion B is shown, the control unit A being removably fixed with the headstock. Carried by the supporting structure there is a spindle transmission, best shown in Fig. 6, comprising an adjustable speed electric motor of which a portion is indicated at C, together with shiftable reverser-interrupter clutches, and various rate change units serially arranged and shiftable to a variety of position combinations collectively effecting, together with the speeds available from motor C, the desired range of spindle speeds. The control unit A forms a closure for the otherwise upwardly open headstock, and operating connection of the unit with the controlled parts takes place as the disassembled unit is moved downwardly to its position shown in Fig. 1.

It will be understood that the lathe referred to includes the bed with which the headstock B is fixed, also suitable carriages or tool supports slidably carried on the bed for supporting and guiding tools in both cross and longitudinal movement relative to the work spindle together with suitable transmission and control mechanism therefor; but since lathes of such type are well known in various forms, and the novel features of the present invention are particularly in the spindle drive and controls herein shown and described, such supplemental structure is not here shown.

Referring to Fig. 6 a lathe spindle 1 is suitably rotatably mounted in end walls 2a, 2b of a headstock hollow frame or housing 2, a portion 1a of the spindle projecting from the headstock in the direction of the tool carriage, not shown. At its projecting end spindle 1 carries a spring collet 3 which may be contracted for gripping a stock bar or work piece, not shown, by means such as a push tube 4, pivoted levers 5, 5 and an operating spool 6 provided with operating means, not shown, in the usual manner. Spindle 1 may be driven at various speeds in either direction by the means of transmission mechanism as follows:

A shaft 10, Figs. 3, 6, is rotatably mounted in suitable bearings 10a, 10b respectively carried by the end wall 2a and by an interior rib or wall 2c. Fixed on shaft 10 there is a driving pulley 11, which is driven from a suitable power source having two or more available speeds, such as electric motor C, for example. A second shaft 12 is parallel to shaft 10 and mounted in suitable end bearings 12a, 12b respectively carried by the end walls 2a, 2b, there being also an intermediate bearing 12c carried by an interior rib or wall 2d. Shaft 10 may drive shaft 12 through a reverser-interrupter device 13, operable to effect alternative forward, reverse or stop of shaft 12 while shaft 10 is continuously uni-directionally driven from pulley 11.

The reverser-interrupter device 13, Fig. 6, is shiftable by a clutch spool 13a, and includes a pair of meshed gears 14, 15 respectively fixed on shaft 12 and on a sleeve 16 which is rotatably supported on shaft 10; also a pair of sprockets 17, 18 respectively fixed on shaft 12 and on a sleeve 19 which is rotatably supported on shaft 10, the sprockets being connected by a chain 20. Fixed respectively with the sleeves 16, 19 are outer clutch members 21, 22, and slidably keyed on the shaft 10 there is an inner shiftable clutch member 23 which carries an intermediate annular abutment 23a. Two groups of clutch friction plates 24, 25 are respectively associated with the outer clutch members 21, 22, each group having its alternate plates slidably keyed with the associated outer clutch member and with the inner clutch member 23. A manually operable clutch lever 26, Fig. 3, fixed on a shaft 27, shifts the clutch spool 13a, Figs. 3, 6, by the means of a lever 29 engaging a suitable annular groove in the spool, the spool being connected to shift the inner clutch member 23 by the means of a pin 31, a rod 32, a cam member 33, and pivoted toggle levers such as 34 which have a lever portion such as 34a engaging a suitable inner annular groove in the inner clutch member 23. When the hand lever 26 is shifted in the one or the other direction from its central position the inner clutch member 23 is correspondingly shifted, thereby effecting pressure engagement of the one or the other of the friction plate groups 24, 25 to drive shaft 12 from shaft 10 in the one direction through gears 14, 15 or in the other direction through sprockets 17, 18 and chain 20. In the intermediate position of hand lever 26 both the friction plate groups are disengaged, and the drive from shaft 10 is interrupted.

A sleeve 35, Fig. 6, is coaxial with shaft 12, but independently journaled in bearings 35a, 35b. Sleeve 35 may be selectively driven either at high speed or alternatively at a low speed, relative to shaft 12, through mechanism as follows: For effecting the relatively high speed of sleeve 35 there is provided clutch mechanism collectively indicated by the numeral 36, shiftable by a clutch spool 36a. Clutch 36 includes a set of friction plates 37 of which the alternate plates are slidably keyed respectively with an outer clutch member 38 fixed with sleeve 35, and with shaft 12. The clutch plates 37 may be alternatively released or forced into pressure engagement by the means of a pivoted lever 39 operated to released or engaged positions accordingly as the clutch shifter spool 36a is axially shifted in the one or the other direction, the spool carrying an operating pin 40 which engages a cam end 39a of the lever. When clutch 39 is engaged the gear sleeve 35 is driven at relatively high speed directly from shaft 12.

For effecting the low speed of gear sleeve 35, Fig. 6, relative to shaft 12 there is provided a reduction train including a meshed pair of gears 41, 42 respectively fixed on shaft 12 and rotatably mounted on a shaft 43, the shaft 43 being coaxial with shaft 10 but independently rotatable on bearings 43a, 43b. The reduction train also includes a clutch mechanism collectively indicated by the numeral 44, shiftable by a clutch spool 44a, and a pair of meshed gears 45, 46 respectively fixed on shaft 43 and on the outer clutch member 38 for rotation with sleeve 35. Clutch 44 includes a set of friction plates 47 of which the alternate plates are slidably keyed with shaft 43 and with an outer clutch member 48 which is fixed with the gear 42. The clutch plates 47 may be alternatively released or forced into pressure engagement by the means of a pivoted lever 49 operated to released or engaged position accordingly as the clutch shifter spool 44a is axially shifted in the one or the other direction, the spool carrying operating pins 50, 50a which operate on a cam end 49a of the lever. When clutch 44 is engaged, and the clutch 36 is disengaged, the gear sleeve 35 is driven at relatively slow speed from shaft 12 through the back gear train.

The shifter spools of clutches 36 and 44 are connected together to effect disengagement of clutch 36 simultaneously with engagement of clutch 44, and vice versa, as is later explained.

A rotatable shaft 51, Fig. 6, may be selectively driven from the gear sleeve 35 at any of three different speeds, there being gears 52, 53, 54 fixed on the sleeve and engageable one at a time respectively with gears 55, 56, 57 which are fixed together and unitarily slidably keyed on the shaft 51, the gear unit being shiftable to effect such alternative engagement by mechanism later described.

The spindle 1 may be selectively driven from shaft 51 at either of two different speeds, there being gears 58, 59 fixed on the spindle and engageable one at a time respectively with gears 60, 61 which are fixed together and unitarily slidably keyed on shaft 51, the unit being shiftable to effect the alternative engagement by mechanism later described.

The described train between the drive shaft 10 and the spindle 1 provides mechanical rate change devices adjustable for different combinations combinedly effective for twelve changes of spindle speed when shaft 10 is driven at constant speed. It will be apparent that when the motor C provides for driving the shaft 10 alternatively at different speeds the number of available changes of spindle speed may be increased accordingly. If the motor C has two speeds the ratio of such motor speeds may be suitably arranged with the ratios of the speed change elements of the mechanical train to effect twenty-four different spindle speeds having suitable total range and in a series forming a substantially geometrical progression. Although other arrangement is contemplated, as will later be pointed out, there will be first described control mechanism suited for the speed arrangement just mentioned.

In this instance the arrangement just mentioned is such that in the low speed position of the friction clutches 36, 44 the shifting of the other rate change units will provide the twelve lowest speeds of the geometrical series of twenty-four speeds, while the high speed position of the friction clutches 36, 44 provides the twelve highest speeds of the series. In other words the arrangement is such that operation of clutches 36, 44 conditions the rate changer, as a whole, to effect an alternative high or low series of speeds combinedly comprising the full range of the rate changer.

Two speed motors, such as are required for the arrangement just mentioned are well known both in direct current and alternating current types. For purposes of illustration the motor C, shown in the wiring diagram, Fig. 8, is a two speed induction motor having energizing coils C1 divided into three sections connectible with a polyphase line circuit D.

The coils of motor C and the bus bars of the line D are connectible in star mesh by a normally open commutating switch E, which may be closed whereby to effect a slow motor speed by energizing a solenoid E1, and are connectible in delta mesh by a normally open commutating switch F, which may be closed by energizing a solenoid F1 to effect a high motor speed. A normally open stop-run switch G may be closed by a solenoid G1, the initial solenoid current being established through a normally open push button switch H, and through a holding circuit which includes a normally closed push button switch I operating to maintain switch G closed until switch I is subsequently opened.

When switch G is open the motor cannot run but at any time when switch G is closed the solenoids F1 or E1 of the commutator switches may be selectively energized through a switch J, whereby to alternatively effect the slow or fast motor speed. The switch J has an operating solenoid J1 which may be energized, except as later stated, by closing a switch K, thereby to operate switch J to a position energizing the fast-motor solenoid F1, but when switch K is open the switch J returns to a normal position in which solenoid E1 is energized and the motor runs at slow speed. Switch K may be manually operated by a knob K1 or operated automatically by means later explained.

The current of switch K and solenoid J1 also includes a normally closed switch L, which may be automatically opened to effect return of the switch J to normal slow-speed position even if switch K is closed, as will be later explained.

It will be obvious that the control device just described is operative to alternatively select either of two speeds substantially irrespective of the type of motor or power source used to drive shaft 10, provided the speed control therefor has two settings. Thus, for example, if the motor is of direct current type the solenoids F1 and E1 may respectively operate to adjust the speed controller to the desired high and low controller positions.

It will be seen that the transmission for the spindle 1 includes four adjustable speed change devices, respectively the speed motor C, the two speed device operated by the clutches 36, 44, the three speed device including the shiftable gears 55, 56, 57; and the two speed device including the shiftable gears 60, 61; these devices being serially arranged in the order recited and combinedly adjustable to effect twenty-four different speed adjustments as has been mentioned.

These devices may be of suitable relative speed ratio effect for various combined results and as to the range of spindle speeds effected thereby, as will later be more fully explained, but there will first be described an arrangement of controls where the speeds are in substantially geometrical progression, and the speed change controlled by shifting the clutches 36, 44 alternatively effects a low series of speeds which comprises the twelve lowest speeds of the available series, or effects a high series of speeds comprising the twelve highest speeds of the available series.

The various rate change devices are all connectible to be power operated, as follows:

For the shifting of the motor speed selector switch K, Fig. 8, there is provided a piston device generally denoted as M, Fig. 7, the piston M1 being connected with an arm K2 of the switch by the means of a fork M2.

For the shifting of clutches 36, 44, Fig. 6, there is provided a piston device generally denoted by the numeral 62, Figs. 3, 7, which includes a piston 63, a double end piston rod 64 having the one end 64a of a diameter larger than the other end, and a shifter spool 66, the spool engaging a lever 67, Fig. 4, fixed on a shaft 68, upon which is also fixed a double end lever 69, the opposite ends of the lever respectively engaging the clutch spools 34a, 44a, Figs. 4, 6. The movement of piston 63 in one direction effects disengagement of clutch 36 simultaneously with engagement of clutch 44, and vice versa, whereby to alternatively effect the previously mentioned low or high series of speeds.

For the shifting of the gear unit 55, 56, 57, Fig. 6, there is provided a piston device generally denoted by the numeral 74, Figs. 3, 7, which includes a piston 75, a piston rod 76, a coupler bar 77, a guide rod 78 and a fork 79, the fork ends engaging on opposite sides of the gear 56 of the gear unit.

For the shifting of the gear unit 60, 61, Fig. 6, there is provided a piston device generally denoted by the numeral 80, Figs. 3, 7, which includes a piston 81, a piston rod 82 and a fork 83, the fork ends engaging on opposite sides of the gear 60.

Primary speed selector means is provided which includes a rotatable speed chart member 84, Figs. 1, 2, carrying adjacent its periphery a chart comprising a series of markings such as 84a, respectively corresponding to the numerical value of the twenty-four different rotative speeds of the spindle 1. Fixed with the frame or housing there is a stationary indicator pointer 85 indicating the various speed positions of the selector chart. The member 84 is fixed on a hub 86 which in turn is fixed on a sleeve 87 keyed with a shaft 88 which may be rotated, together with the chart 84, by the means of a hand wheel 89, the shaft 88 being connected for rotation of a selector cam shaft 90 by the means of sprockets 91, 92 and a chain 93. Shaft 90 has fixed for rotation therewith certain cam elements, later described, primarily controlling the positions of shifter piston devices M, 62, 74, 80, and thereby controlling the rotational speeds of spindle 1.

Means are provided for various alternative modes of spindle speed control, as will presently be described, but for illustration of the function and operation of the primary control from the selector chart and indicator just referred to there will first be described what may be termed the direct control means whereby, as the chart 84a, Fig. 1, is turned to bring one or another of the markings thereof to coincide with the pointers 85, the control mechanism automatically substantially immediately effects the indicated speed.

A reservoir 94, Fig. 7, supplies liquid, in this instance oil, to a pump such as 95 which is continuously driven, as by a pulley 11a, Fig. 6, wherever the shaft 10 is driven. The reservoir 94 is formed as a bottom closure for the hollow headstock B, Figs. 1, 3, whereby to receive waste or surplus oil from the transmission and control mechanism within the headstock. Lubrication for the transmission may be provided either by dipping the lower gears of the transmission train directly into the oil contained in reservoir 94, or by spraying the excess above that required for the controls over the gears and shafts, or in any suitable well known manner.

Pump 95, Fig. 7, supplies oil to a channel or conduit 96, wherein the liquid is maintained at substantially constant pressure by a spring pressed relief plunger 97, surplus oil passing into a header 98 from which it may be drawn by suitable openings or channels, not shown, for either direct or spray lubrication, etc., as mentioned, of the transmission within the headstock A, or other desired purpose.

Associated with the selector cam shaft 90, Figs. 3, 7, there are a plurality of control valve units respectively generally denoted by the numerals 99, 100. Valve unit 99 includes valve plunger or piston members 99a, 99b reciprocable within coaxial valve sleeves 99c, 99d. Valve unit 100 similarly includes valve plunger or piston members 100a, 110b reciprocable within coaxial valve sleeves 100c, 100d. The upper ends, Fig. 7, of both valve members 99a, 100a act as pistons and are continuously urged downwardly together with valve members 99b, 100b by fluid pressure from channel 96, the valve units receiving fluid respectively from ports such as 101, 102. The lower ends, Fig. 7, of both valve members 99b, 100b are continuously urged upwardly, together with valve members 99a, 100a, by fluid pressure from the channel 96, receiving fluid respectively from restricted area ports such as 103, 104.

The piston area of the valve members 99a, 100a being, as shown, somewhat smaller than that of the valve members 99b, 100b, the piston action will normally force the valve members of both valve units 99, 100 to their uppermost positions, Fig. 7, but certain control means, later described, is provided to selectively relieve the pressure on the lower end, Fig. 7, of either of the valve elements 99b, 100b, whereupon the relieved valve elements will immediately move downwardly.

For purposes of speed control of the direct type now being considered, in which, as stated, the relative movement of the chart 84a and indicator 85 substantially immediately results in a change to the newly indicated speed, only the elements of the valve unit 99 are moved downwardly, Fig. 7, and such movement is, for direct control, effected as follows:

Fixed on the selector cam shaft 90, Figs. 3, 7, there is a cam 105 providing notches such as 105a respectively corresponding in position to the different speed positions of the speed chart 84a relative to the indicator 85. A spring pressed poppet valve 106 has an end portion cooperating with cam 105 to permit the valve to seat whenever the chart and indicator come to rest in any speed position, but upon relative movement of the chart and indicator the high cam portions between the notches 105a opens the poppet valve to permit fluid to pass through the valve and out through a drain port 107.

The poppet valve 106 is connectible to drain the fluid pressure from the lower end of valve unit 99 through a port 108 and a channel 109. A valve 110, Figs. 1, 7, has a hand lever 110a, and a member 110b providing ports or passages 110c, 110d, the valve member having alternative positions respectively opening and closing the channel 109, for reasons later explained. For the direct mode of rate changer operation now considered the valve 110 is in the position shown in Fig. 7, in which channel 109 is open through the valve port 110c and, in such valve position, any relative movement of the speed selector chart and indicator, whereby to open poppet valve 106, as described, will drain the fluid from the lower end of valve plunger 99b and the valve elements 99a, 99b will immediately move downwardly, Fig. 7, to the full extent of their downward movement. It will be noted that by reason of the restriction of port 103 this action occurs despite the fact that fluid is still being delivered through port 103, the port opening 103 being sufficiently small that the fluid is forced out through the poppet valve 106 by the pressure on the upper end of valve members 99a, 99b faster than it can enter through the restricted port 103.

The relative movement of chart 84a and indicator 85 which rotates selector cam shaft 90 and results in downward movement of plunger valves of valve unit 99, as just described, also positions various cams on the shaft 90 which operate poppet valves for controlling the piston devices M, 62, 74, 80, Fig. 7, as follows:

For the piston device M, Fig. 7, there are provided two control cams M4, M5, Figs. 2, 3, 7, fixed on shaft 90 and respectively determinative of alternative open or closed positions of poppet valves such as M6, M7. For the piston device 62 there is provided a control cam 111, fixed on shaft 90 and operatively determinative of the alternative open or closed position of poppet valves such as 112, 113. For the piston device 74 there are provided three control cams 114, 115, 116 respectively controlling the positions of poppet valves 117, 118, 119. For the piston device 80 there are provided two control cams 120, 121 respectively controlling the position of poppet valves 122, 123.

The arrangement of control cams and poppet valves, just described, is such that in each speed position of the selector chart 84a and indicator 85 one of the poppet valves of each of the piston devices will be open while the other poppet valves are closed. Pressure fluid may be supplied to the piston devices, Fig. 7, through ports 124, 124a for piston device 62, through a port 125 for piston device 74, through a port 126 for piston device 80, and through a port M8 for piston device M.

Referring to the piston device 62, Fig. 7, which shifts the clutches 36, 44, Fig. 6, alternatively to high or low speed series position, pressure fluid from port 124a acts directly on the left end of the piston, which is of relatively smaller effective area by reason of the relatively larger piston rod 64a at this end of the piston. Pressure fluid from the other port 124 passes through a floating valve 127 having a floating plunger 127a. The one outlet of floating valve 127 communicates with poppet valve 112 through a passage 128. The other outlet of valve 127 communicates through a passage 130 with the poppet valve 113 and with a port 131 leading to the right-hand end of the piston 63. When poppet valve 112 is closed and poppet valve 113 is opened by cam 111, as shown in Fig. 7, the floating plunger 127a moves in the direction of the open poppet valve to close off the flow of pressure fluid to the right end of piston 63 and at the same time this end of the piston is vented through the open poppet valve, whereby pressure from port 124a forces the piston to the right-hand position shown in Fig. 7, which effects slow speed position of the clutches 36, 44. When poppet valve 112 is opened by cam 111 the poppet valve 113 is simultaneously closed and under such conditions the floating plunger 127a moves in the direction to close off leakage through the open poppet valve while maintaining the pressure fluid from port 124 applied to the right end piston face. Under such conditions piston 63 moves to the left of the position shown in Fig. 7, whereby to effect the high speed position of the clutches 36, 44, since, although pressure is operating on both piston faces, the right face has the larger effective area, as previously stated.

Referring to piston device 80, Fig. 7, which shifts the gear unit 60, 61, Fig. 6, to its alternative speed positions, pressure fluid delivered to the port 126 passes through a floating valve 132 having a floating plunger 132a, and may be delivered to the opposite ends of piston 81 through ports 133 or 134 respectively communicating with the different poppet valves 122, 123. When one of the poppet valves is opened by the cams 120 or 121 the leakage of fluid through the open valve causes the floating plunger 132a to move to close off the flow of pressure fluid in the direction of the open valve. Pressure is then operating only on the piston face which is in communication with the closed poppet valve, the other end of the piston being vented through the open valve, and the piston will be forced to move in the direction of the port leading to the open valve. Thus, in the drawing, Fig. 7, the cam 120 has opened the poppet valve 122, resulting in movement of piston 81 to its right-hand position. As has been stated, the piston movements operate to shift the gear unit 60, 61, Fig. 6, to its different speed positions.

The piston device 74, Fig. 7, which effects the alternative positions of the gear unit 55, 56, 57, has three positions. So far as concerns the control of the piston 75 to effect the one or the other of its opposite end positions pressure fluid supplied to the port 125 operates through a floating valve 135 and ports such as 136, 137 in the same manner as for the piston device 80 just previously described. A third or central position of the piston 75, shown in Fig. 7, is obtained when cam 114 opens the poppet valve 117 which communicates with a central port 138. When poppet valve 117 is open the action is the same except that the piston moves from the one or the other of its end positions only until the central port 138 is covered, thereby preventing leakage of fluid through the open poppet valve.

The piston device M, Fig. 7, which effects the alternative speed adjustment of the motor speed control switch K has two positions. Pressure fluid delivered to the port M8 passes through the floating valve and channel means shown to control the alternative position of piston M1 in the same manner as described for the two position piston device 80.

The manner of providing pressure fluid to the piston devices M, 82, 74, 80, Fig. 7, to effect the direct type of speed control now being considered will now be described.

As previously explained, when the valve 110, Fig. 7, is in the position for direct speed control, any rotation of speed selector chart 84a relative to indicator pointer 85 will operate poppet valve 106 to cause the valve plungers 99a, 99b to quickly move downwardly to the full extent of their movement. Following such downward movement, as soon as the selector shaft 90 and cam 105 comes to rest in the required speed position, the poppet valve 106 closes and the pressure fluid from port 103 effects upward movement of valve members 99a, 99b, such upward movement being relatively slow because of the restriction of port 103.

A port 139 in the valve sleeve 99d is continuously supplied with pressure fluid from the channel 96 through an annular groove 140, a channel 141, an annular groove 142, and channels 143, 144. At a certain position during the described slow upward movement of valve member 99b pressure fluid from the port 139 is supplied to the port 125 of piston device 74, also to the port 126 of piston device 80, and also to the port M8 of piston device M, through an annular groove 145 and drilled holes 146, 147, 148 in valve member 99b, a port 149 in valve sleeve 99d, and channels 150, 151, the last channel being simultaneously connected to each of the piston device ports mentioned.

Somewhat later in the continued upward movement of valve member 99b the same drilled hole 148 of valve member 99b similarly supplies pressure fluid from the port 139 to the port 124 of the piston device 62 through a port 155 and an annular groove 155a in the valve sleeve 99d, and through channels 155b, 155c. Simultaneously with such supply of pressure fluid to port 124 pressure fluid is also supplied to the port 124a of piston device 62 through the drilled hole 147, a drilled hole 148a, a port 156 and an annular groove 156a in the valve sleeve 99d, and through channels 156b, 156c.

The upward movement of valve member 99b is relatively slow, as mentioned, and the pressure ports communicate as described for a sufficient interval that the piston devices 62, 74, 80 are operated to effect the spindle speed indicated on the selector chart, in the manner previously described. It may be noted that although the valve member 99b travels during its downward movement through the same pressure fluid supply positions as just described, but in reversed order, the relatively rapid downward movement does not allow sufficient time for the piston devices 62, 76, 80 to operate. In the upper position of the valve member 99b, as shown in Fig. 7, the fluid pressure supply from port 139 is cut off.

The pressure fluid supplied to the piston device during upward movement, as just described, shifts the various devices according to the position of the selector device and of the control cams on shaft 90, Fig. 7, and the control cams are formed and arranged to operate the poppet valves in such sequence that, during the direct method of control, one revolution of selector chart 84a relative to indicator 85 effects the various speed changes at substantially equally spaced increments of such relative movement and in their numerical order.

Means are provided to invariably effect slow rotation of the shiftable gear units 55, 56, 57 and 60, 61 during shifting thereof; whereby to avoid abutment of the end faces of the gears, such as might block the shifting, and other objectionable results. Such slow rotation is effected by providing control means insuring that both the speed change unit consisting of the friction clutches 36, 44, and also the speed controller for the motor C, shall invariably occupy their slow speed positions during any shifting of the gears.

For insuring the slow speed position of clutches 36, 44 during any change of rate the following mechanism is provided: When the valve elements 99a, 99b approach their downmost position, Fig. 7, and during a portion of the upward movement, prior to admitting pressure fluid to the piston devices of the shiftable gear units, the fluid pressure port 139, Fig. 7, communicates with the port 156 in valve sleeve 99d, and thence with the port 124a of piston device 62, through the annular groove 145 and drilled holes 146, 147, 148. The fluid pressure thus supplied to the piston device 62 urges piston 63 to the right in Fig. 7 and, at the same time, pressure opposing such movement of piston 63 is relieved, since the valve member position which effects the pressure connection mentioned also effects a drain connection of the port 124 of piston device 62, the drain operating through the channels 155c, 155b, annular groove 155a, port 155, and through the annular space surrounding the relatively small diametered plunger valve member 99a which then stands opposite port 155, the drain fluid passing out of such annular space through a slot 162 in the end of valve sleeve 99d, an annular groove 163 and a drain channel 164. The mechanism described will have no effect if the clutches 36, 44 are already in slow speed position at the start of a rate change operation, but if they are then in high speed position they will be shifted to slow position before the shifting of the gear units takes place.

To insure that the motor control switch K is in slow speed position during any shifting of the rate change gear units the following mechanism is provided: Referring to Figs. 7, 8, the switch L is continuously urged toward open position by suitable means such as a spring L1. The switch is forced to closed position, against the resistance of the spring L1, by the means of a plunger L2 whenever the fluid pressure acting on valve members 99a, 99b forces the valve members to their upper position, Fig. 7. When the valve members move down, as previously described, during a rate change operation, the plunger pressure on switch L is released and the switch opens, remaining open until the valve members are returned to their upper positions at the completion of the rate change. Since the switch L is in the circuit of the solenoid J1 the opening of the switch L insures that motor C will run at slow rate, irrespective of the position of the switch K which is normally used for control of the motor speed.

In various types of machine tools, and particularly in lathes, it is sometimes desirable to alternatively effect a high speed or a relatively low speed by independent control means, that is to say without resetting the normal speed selective mechanism. Such mode of operation will, for convenience, be termed high-low speed control and may be used in a lathe, for example, when the work piece requires a high speed for a turning or drilling operation to be immediately followed by an operation such as reaming or threading at relatively low speed.

Such high-low operation is here effected by providing control means for shifting the clutch members 36, 44 selectively to high speed or low speed position irrespective of the speed position of the normal rate change means, the control being from a hand lever 165, Figs. 2, 5, 7. This control mechanism will first be described as it operates when the valve 110, Fig. 7, is set for the previously described direct mode of control. The lever 165 is fixed on a shaft 166, upon which is also fixed a cam member 167 having cam portions 167a, 167b, 167c respectively operatively controlling the open or closed positions of poppet valves 168, 169, associated with valve unit 99, and of a poppet valve 170 associated with the valve unit 100. The lever 165 and shaft 166 are normally urged by a spring pressed plunger 171, Fig. 3, to a central position in which each of the poppet valves just mentioned is closed, but when lever 165 is shifted downwardly, Fig. 1, the cam portion 167c opens poppet valve 170, thereby draining the pressure fluid from the chamber underneath valve member 100b, Fig. 7, through the open poppet valve and through a drain port 170a, faster than the fluid can enter the chamber through the restricted pressure port 104, whereupon the valve members 100a, 100b, immediately move down from the position shown in Fig. 7 to their lowermost positions.

In this lowermost position of the valve members 100a, 100b fluid from the pressure channel 96, Fig. 7, is utilized to urge piston 63 to the right in Fig. 7 to effect the slow speed position of the clutches 36, 44 of the primary speed change unit, the pressure fluid passing through the channels 144, 143, the annular groove 142 and a port 173 in the valve sleeve 100d, an annular groove 174 and drilled holes 175, 176, 177 in valve member 100b, another port 178 and annular groove 179 in valve sleeve 100d, a channel 180 and the annular groove 156a, and channels 156b, 156c connected to the port 124a as previously described. At the same time the fluid pressure is drained from the right-hand end of piston 63 through the port 131, a port 181, a channel 182, and a port 183, the port 183 then communicating with a drain port 184 through an annular groove 185 and a port 186 in the valve sleeve 100d, and through the annular channel around the reduced diameter valve member 100a, which effects communication to the drain port when valve member 100b is in its lowest position. The result of the described pressure and drain connection is to force the piston 63 to the right in Fig. 7, whereby to effect the low speed adjustment of the clutches 36, 44 of the primary speed change unit irrespective of the position of the speed selector device previously described.

It will be noted that, following the downward shifting of lever 165 to effect low speed as just described, the lever may be immediately released to return to its central position. Such release permits the poppet valve 170 to close and the valve elements 100a, 100b are then returned by fluid pressure to their upper position, Fig. 7, but the clutches 36, 44 remain in their low speed position, since no fluid pressure is then acting on the piston 63.

To effect the high speed in the high-low mode of operation the lever 165 is moved upwardly from the position shown in Fig. 1, the cam portions 167a, 167b, Figs. 5, 7, then operating to open both the poppet valves 168, 169. However, the opening of poppet valve 168 in the present described high-low operation, that is to say while valve 110 is set for the direct type of speed control, is ineffective, since the drain channel for the poppet valve extends from a port 187 through a passage 188 in valve 110, such passage being closed, as shown in Fig. 7, while valve 110 is positioned for the direct method of speed control as has been previously stated. Assuming that the drain from poppet valve 168 is closed, as stated, the opening of poppet valve 169 effects a movement of valve unit 99 as follows: The poppet valve 169 drains through a port 189 and an annular groove 190 in the valve sleeve 99d, and through a channel 191 and a drain port 192, and owing to the position of the port 189 the valve members 99a, 99b are forced downwardly, when poppet valve 169 is open, only until the valve member 99b covers the port. The position of the valve member 99b as thus determined is the same as that previously described, for the direct control, wherein pressure fluid is supplied from the pressure port 139 of valve sleeve 99d to both the ports 124, 124a of the piston device 62 and, assuming that the rate selector is set for any of the high series of speeds, that is to say any speed for which the cams on shaft 90 are set to effect the high speed position of the clutches 36, 44, the piston 63 of the piston device 62 will now be immediately shifted to effect such high speed clutch position. Similarly as for the downward operation of lever 165 to effect the slow speed, the lever may be immediately released from high speed position to return to its central position and the clutches 36, 44 will remain in high speed position.

For certain work it is desirable to pre-set the selector chart 84a in advance of the shifting of the rate change units which, during the direct mode of operation previously described, are shifted substantially immediately when the selector device is adjusted. Thus, for example, it might be preferable to pre-set, during one operation of an operating cycle, the speed or speeds required for the next succeeding operation.

For such pre-set control the valve 110, Figs. 3, 7, is adjusted to a position closing the passage through channel 109 and valve port 110c, and opening the passage 188 through valve port 110d.

In this valve position the rotation of the speed selector does not drain the fluid from the bottom, Fig. 7, of valve 99, whereby to effect shifting of the rate change units, because the previously described drain through poppet valve 106 is closed. However, fluid may be drained from the bottom of valve unit 99 whereby to effect the indicated speed at any subsequent time, usually at the beginning of the next operation. To effect this result lever 165 is raised from the position shown in Fig. 1 whereby to open poppet valve 168, which in the present adjustment of valve 110 can now drain through the port 187, channel 168 and port 110d. Raising and then releasing the lever 165 immediately effects the cycle of complete downward and upward movement of valve members 99a, 99b which, as previously explained, shifts the various rate change units to effect the indicated speed.

The previously described high-low operation of the rate changer is available in either the direct or pre-set setting of the valve 110. In either case the upward movement of lever 165 effects the indicated speed, and the downward movement of lever 165 effects the low speed position of the clutch unit 36, 44, irrespective of the position of the speed selector. Whenever the speed selector occupies a position indicating one of the high series of speeds the lever 165 may be alternatively shifted, at any time, to obtain the indicated high speed or the corresponding speed of the slow series.

However, if the speed indicator is adjusted to indicate one of the low series of speeds the downward movement of lever 165 will not effect a speed change. While such downward lever movement would do no harm it is preferable that it be prevented except when the speed selector is set to effect a high speed on the upward lever movement. Interlock means for effecting this result is shown in Figs. 3, 5. This interlock comprises a member 193 fixed on speed cam shaft 90 and configurated to contact a member 194 fixed on sleeve 167 to prevent downward movement of the high-low control lever 165 whenever the shaft 90 and the selector device are in any position for effecting one of the low series of speeds.

Where a work piece requires a series or cycle of operations requiring different speed indicator positions it is sometimes convenient to pre-indicate such positions and the preferred or necessary sequential order thereof for all steps in the cycle. For such pre-indication there is provided a set of differently marked indicating elements such as spring clips 210, 210a, 210b, Figs. 1, 2, adapted to be interchangeably engaged and retained in various angular positions on the grooved rim, Fig. 1, of the dial 84. As an example, the clip 210, here shown, bears the number 3, corresponding to the third operation of a series, and is positioned to effect the speed selector setting required for such third operation when the selector chart is rotated to bring the clip adjacent to the stationary indicator pointer 85. It will be understood that a set of these clips, as used, includes as many clips as there are speed selector positions in an operation cycle, each clip being differently marked and positioned to indicate the required selector positions and the order of use thereof. By reason of the provision for high-low operation of the rate changer, as previously described, any sequence indicator positioned for pre-indicating one of the high series of speeds also pre-indicates the corresponding speed of the low series, since both such high and low speeds are immediately available in the same setting of the selector.

Means are provided for selecting the rate changer adjustment in accordance with the cutting speed required on the work piece, as follows: The rotative speed chart member 84, Figs. 1, 2, is conical in form and relatively thin, and is fitted adjacently outside a correspondingly conical chart member 220 fixed on a hub portion 220a which is relatively rotatable on the sleeve 87, whereby chart members 84, 220 are also relatively rotatable. An end flange 221 fixed on sleeve 87 provides an aperture or window 221a. The end face of the hub 220a adjacent the flange 221 carries a scale or chart of linear cutting speeds, one of the markings of the chart being shown at 222, the various markings being suitably angularly arranged to be visible one at a time through the window 221a as the member 220 is relatively rotated by a handle 223, and the markings collectively representing the range of cutting speeds desired.

Diameter charts indicating, in this instance, different diameters of work on which the cutting tools may operate, are also provided. These diameter charts cover the range of work diameters for which the machine is adapted and consist of different sets of markings such as 224a, 224b, 224c, 224d each carried on the member 220 and respectively visible through different window openings 225a, 225b, 225c, 225d in the member 84. The arrangement of the cutting speed and diameter charts is such that, as the member 220 is rotated by the handle 223 relative to the hub 87, whereby to expose different cutting speeds through the window 221a, the values on the diameter charts are brought to coincide or align with the values on the rotational speed chart 84a which will effect the indicated cutting speed.

The limitations of machine design are such that, ordinarily, not all the cutting speeds may be obtained for all the diameters listed on the diameter charts, but the window apertures for the diameter charts, as here shown, are positioned to visibly exhibit only those diameters which can be machined by the available spindle speeds at the cutting speed which is simultaneously exhibited.

The described arrangement of charts respectively indicating rotary speed, cutting speed and diameter is useful in a variety of ways. Thus, for example, in any setting of the rotary speed chart 84a relative to pointer 85, if the diameter chart is relatively rotated by the handle 223 to indicate the instant work diameter against the same pointer, the instant cutting speed will be indicated through the window 221a. Also, if the cutting speed chart is rotated for a desired cutting speed to be visible through window 221a, the selector mechanism may be positioned to effect the indicated cutting speed for any of the diameters indicated on the diameter chart, without reference to the chart of rotary spindle speeds, by rotating the selector to indicate the diameter against the pointer 85. Also sequence indicating devices such as the sequentially numbered clips 210 can be arranged in proper position to indicate a sequence of diameters on the diameter chart and the proper rotary speeds to effect the indicated cutting speeds for these various diameters may be obtained in proper sequence, without reference to the chart of rotary spindle speeds, by rotating the selector to bring the clips against the indicator 85 one after another in their numbered order. Various other manners of use will be apparent from these examples.

It will be noted that in all the rate changer shifting operations, by reason of the positioning of the pressure fluid supply ports in the valve units 99, 100, Fig. 7, the pressure fluid on piston devices M, 62, 74, 80 operates only during movement of the valve members of these valve units. When the valve members are in their upper positions as shown in Fig. 7, all fluid pressure on piston devices M, 74, 80 is released through a channel 230, a passage 231, a drilled hole 232 in the valve sleeve 99c, and an annular groove 233 in valve member 99a. Pressure fluid to port 124 of piston device 62 is also relieved through a channel 234, a passage 235, a drilled hole 236 in valve sleeve 99c, an annular groove 237 in valve member 99a, drilled hole 238 in sleeve 100c, and an annular groove 239 in valve member 100a. When the piston device 62, Fig. 7, has been shifted its clutch mechanism 36, 44, Fig. 6, is retained in position until the next shifting operation by the locking of the cam surfaces of shifter levers 39, 49 against the lever operating pins. The shiftable gear units are yieldably retained in shifted position by detent notches, such as 240, Fig. 7, associated with their respective piston devices, there being for each gear unit piston device detents such as shown in Fig. 7A each providing opposed plungers such as 241, 242 adapted to enter the notches such as 240, and a spring such as 243 simultaneously yieldably urging the plungers into notch engagement. The motor rate change switch K may also be similarly retained if desired but it may be preferable to leave this switch free for manual operation from the knob K1.

While the serial arrangement of rate change devices may be used to effect twenty-four indicated speeds in geometrical progression, as described, a simplification of control mechanism and other advantages may be had, while still retaining most of the advantages of the mechanism described, by using a somewhat different arrangement.

Thus, for example, the rate change devices respectively comprising the clutches 36, 44, Fig. 6, the shiftable gears 55, 56, 57, and the shiftable gears 60, 61, may be of such relative ratio as to effect twelve speeds in a geometrical progression, instead of twenty-four, and comprising a low series of six speeds provided by shifting the clutches 36, 44 to low speed position and a high series of six speeds provided by shifting the clutches 36, 44 to high speed position. Such twelve speeds may, for example, cover the range of speeds normally used on the machine, while the additional range obtained by use of the two speed motor may be either higher or lower than the normal range.

The additional range may, for example, extend to twice the highest normal speed or to half the lowest normal speed accordingly as the normal speed series is obtained from the low or from the high range of speeds of the motor, where the high motor speed is double that of the low speed.

In modifications such as mentioned the indicating means of the speed selector and the mechanism controlled by selector movement may provide for only the twelve normal geometrically arranged speeds, since the operator may manually control the two speeds of the motor and modify the selector chart readings accordingly as the motor speed control switch K, Fig. 1, is observed to be in high speed or low speed position, or if preferred the charts might show two sets of figures, respectively for high and low motor speed.

The previously described means for automatically controlling the position of speed change switch K, comprising the piston device M, Fig. 7, and its control cams M4, 5 and poppet valves M6, M7, etc., would then be unnecessary. It is desirable, however, to retain the described automatic control of the switch L, to insure that the motor shall not run at fast speed during gear shifting.

Such modification and simplification of the structure still provides the various described forms of speed control in both the high range and low range of speeds available from the two speed motor, that is to say either direct or pre-set method of effecting the indicated speed, together with an available high-low speed operation in either method of control, and pre-selection of a preferred operation sequence of speeds for any of the available methods of control.

It is to be noted that the automatic control of two speeds of the driving motor may be desirable for facilitating rate change operations, as herein explained, in instances where it is not necessary or desirable to utilize the increased range or number of spindle speeds thereby rendered available. Reducing the motor speed during a rate change materially reduces the inertia of the mechanical trains driven through the motor and permits of effecting rate changes in much less time than would otherwise be practical, as well as facilitating the engagement of sliding gears, jaw clutches and the like.

What is claimed is:

1. In a machine tool the combination of a transmission including a primary rate change device shiftable to relatively high and low speed positions thereof and other shiftable rate change means driven through said primary device, said device and rate change means being shiftable to various position combinations thereof respectively for different speed ratios of said transmission, control means for said transmission including members movable into various relative positions respectively corresponding to different of said position combinations and shifter means operable for effecting the position combination corresponding to the position of said members in various of said member positions, a power source for driving said transmission comprising a motor operable for relatively high and low speeds, control means for said motor including elements shiftable to different relative positions respectively for said high and low motor speeds and shifter means for effecting both said element positions, and means interconnecting said transmission control and motor control means for operation of said shifter means to effect a simultaneous low speed position of said primary device and of said motor control elements during shifting of said other shiftable rate change means.

2. In a machine tool the combination of a transmission including a plurality of rate change devices shiftable for effecting various speed position combinations thereof respectively for different speeds, control means for said transmission including members movable into various relative positions respectively corresponding to different of said position combinations and shifter means operable for effecting the position combination of said devices corresponding to the relative position of said members in various of said member positions, a power source for driving said transmission comprising a motor operable for relatively high and low speeds respectively for said position combinations collectively to effect a high range series and a corresponding low range series of transmission output speeds, control means for said motor including elements shiftable to different relative positions respectively for said high and low motor speeds and shifter means for effecting both said element positions, means for operation of said motor control means, for selectively effecting the high and low motor speed position of said motor control elements, and means interconnecting said transmission control and motor control means for effecting said low speed position of said motor control elements during shifting of some of said rate change devices.

3. In a machine tool the combination of a transmission including a primary rate change device shiftable to relatively high and low speed positions thereof and other shiftable rate change means driven through said primary device, said device and other rate change means being shiftable to various position combinations thereof respectively for different speeds, control means for said transmission including members movable into various relative positions thereof respectively corresponding to different of said position combinations and shifter means for effecting the position combination corresponding to the relative position of said members in various of said member positions, a power source for driving said transmission comprising a motor operable for relatively high and low speeds respectively for said position combinations collectively to effect a high range series and a low range series of transmission output speeds, control means for said motor including elements shiftable to different relative positions respectively for said high and low motor speeds and shifter means for effecting both said element positions, means for operation of said motor control means for selectively effecting the high or low motor speed position of said elements, and means interconnecting said transmission control and motor control means for effecting a simultaneous low speed position of said motor control elements and a low speed position of said primary device during shifting of said other rate change means.

4. In a machine tool the combination of a transmission including a plurality of rate change devices collectively shiftable for effecting various position combinations thereof, a power source for driving said transmission including a motor operable at a plurality of speeds, control means for said motor including elements shiftable to different relative positions respectively for different of said motor speeds and including a position for a low motor speed, said motor speeds and rate change devices being of ratio for different of said position combinations of said devices together with different of said positions of said motor control elements to collectively effect a series of transmission output speeds substantially in geometrical progression, speed selector means including members having different relative positions respectively corresponding to different speeds of said geometrical series, shifter means for said rate change devices and motor control elements, and control means for operation of said shifter means to shift said rate change devices and motor control elements to positions thereof effecting the speed of said series corresponding to the position of said speed selector members, the last mentioned control means including means preventing shifting of some of said rate change devices except during said low speed position of said motor control elements.

5. In a machine tool the combination of a transmission including a primary rate change device shiftable to relatively high and low speed positions thereof and other shiftable rate change means driven through said primary device, said primary device and rate change means being collectively shiftable for effecting various speed position combinations thereof, a power source for driving said transmission including a motor operable at a plurality of speeds, different of said motor speeds together with different of said speed position combinations collectively effecting a series of transmission output speeds substantially in a geometrical progression, control means for said motor including elements shiftable to different relative positions respectively for different of said motor speeds including a position for a low motor speed, speed selector means including members movable for different relative positions respectively corresponding to different speeds of said geometrical series, shifter means for said device, said rate change means and said motor control elements, control means for operation of said shifter means to effect the speed of said series corresponding to the position of said selector members in various positions of said members, and means associated with the last mentioned control means for effecting said low speed position of said primary device together with said low speed position of said motor control elements during shifting of some of said other rate change devices.

6. In a machine tool the combination of a transmission including a primary rate change device shiftable to relatively high and low speed positions thereof and other shiftable rate change means driven through said primary device, said device and rate change means being shiftable to various position combinations thereof respectively for different speed ratios of said transmission, control means for said transmission including members movable into various relative positions respectively corresponding to different of said position combinations and shifter means operable for effecting the position combination corresponding to the position of said members in various of said member positions, a power source for driving said transmission comprising a motor operable for relatively high and low speeds, control means for said motor including elements shiftable to different relative positions respectively for said high and low motor speeds and shifter means for effecting both said element positions, and power means controlled in accordance with operation of said transmission control means to effect said low speed position of said motor control elements and simultaneously the low speed position of said primary device in advance of said operation of said shifter means effecting said position combination.

7. In a machine tool the combination of a transmission including a primary rate change device shiftable to relatively high and low speed positions thereof and other shiftable rate change means driven through said primary device, said device and other rate change means being shiftable to various position combinations thereof respectively for different speeds, control means for said transmission including members movable into various relative positions thereof respectively corresponding to different of said position combinations and shifter means for effecting the position combination corresponding to the relative position of said members in various of said member positions, a power source for driving said transmission comprising a motor operable for relatively high and low speeds respectively for said position combinations collectively to effect a high range series and a corresponding low range series of transmission output speeds, control means for said motor including elements shiftable to different relative positions respectively for said high and low motor speeds and shifter means for effecting both said element positions, means for operation of said motor control means for selectively effecting the high or low motor speed position of said elements, and power means controlled in accordance with operation of said transmission control means to effect said low speed position of said motor control elements and simultaneously the low speed position of said primary device in advance of said operation of said shifter means effecting said position combination.

8. In a machine tool the combination of a transmission including a plurality of rate change devices collectively shiftable for effecting various position combinations thereof, a power source for driving said transmission including a motor operable at a plurality of speeds, control means for said motor including elements shiftable to different relative positions respectively for different of said motor speeds and including a position for a low motor speed, said motor speeds and rate change devices being of ratio for different of said position combinations of said devices together with different of said positions of said motor control elements to collectively effect a series of transmission output speeds substantially in geometrical progression, speed selector means including members having different relative positions respectively corresponding to different speeds of said geometrical series, shifter means for said rate change devices and motor control elements, control means for operation of said shifter means to shift said rate change devices and motor control elements to positions thereof effecting the speed of said series corresponding to the position of said speed selector members, and power means controlled in accordance with operation of the last mentioned control means to effect said low motor speed of said motor control elements in advance of any operation of said shifter means effecting the speed of said series corresponding to the position of said selector members.

9. In a machine tool the combination of a transmission including a primary rate change device shiftable to relatively high and low speed positions thereof and other shiftable rate change means driven through said primary device, said primary device and rate change means being collectively shiftable for effecting various speed position combinations thereof, a power source for driving said transmission including a motor operable at a plurality of speeds, different of said motor speeds together with different of said speed position combinations collectively effecting a series of transmission output speeds substantially in a geometrical progression, control means for said motor including elements shiftable to different relative positions respectively for different of said motor speeds including a position for a low motor speed, speed selector means including members movable for different relative positions respectively corresponding to different speeds of said geometrical series, shifter means for said device, said rate change means and said motor control elements, control means for operation of said shifter means to effect the speed of said series corresponding to the position of said selector members in various positions of said members, and power means controlled in accordance with operation of the last mentioned control means to effect said low motor speed position of said motor control elements and a simultaneous low speed position of said primary rate change device in advance of said operation of said shifter means effecting the speed of said series corresponding to the position of the selector members.

10. In a machine tool the combination of a transmission including a plurality of rate change devices shiftable for effecting various speed position combinations thereof respectively for different speeds, control means for said transmission including members movable into various relative positions respectively corresponding to different of said position combinations and shifter means operable for effecting the position combination of said devices corresponding to the relative position of said members in various of said member positions, a power source for driving said transmission comprising a motor operable for relatively high and low speeds respectively for said position combinations collectively to effect a high range series and a corresponding low range series of transmission output speeds, control means for said motor including elements shiftable to different relative positions respectively for said high and low motor speeds and shifter means for effecting both said element positions, means for operation of said motor control means for selectively effecting the high and low motor speed position of said motor control elements, whereby to select said high or low range of output speeds, and means interconnecting said transmission control and motor control means including means for effecting said low speed position of said motor control elements during operation of said transmission control shifter means for shifting some of said rate change devices, and including means for effecting a different speed position of said motor control elements following the last mentioned operation of said transmission control shifter means.

11. In a machine tool the combination of a transmission including a primary rate change device shiftable to relatively high and low speed positions thereof and other shiftable rate change means driven through said primary device, said device and other rate change means being shiftable to various position combinations thereof respectively for different speeds, control means for said transmission including members movable into various relative positions thereof respectively corresponding to different of said position combinations and shifter means for effecting the position combination corresponding to the relative position of said members in various of said member positions, a power source for driving said transmission comprising a motor operable for relatively high and low speeds respectively for said position combinations collectively to effect a high range series and a corresponding low range series of transmission output speeds, control means for said motor including elements shiftable to different relative positions respectively for said high and low motor speeds and shifter means for effecting both said element positions, means for operation of said motor control means for selectively effecting the high or low motor speed position of said elements, whereby to select said high or low range of output speeds, and means interconnecting said transmission control and motor control means including means for effecting a simultaneous low speed position of said motor control elements and low speed position of said primary device during operation of said transmission shifter means, and including means for effecting a different speed position of said motor control elements following the last mentioned operation of said transmission control shifter means.

12. In a machine tool the combination of a transmission including a plurality of rate change devices collectively shiftable for effecting various position combinations thereof, a power source for driving said transmission including a motor operable at a plurality of speeds, control means for said motor including elements shiftable to different relative positions respectively for different of said motor speeds and including a position for a low motor speed, said motor speeds and rate change devices being of ratio for different of said position combinations of said devices together with different of said positions of said motor control elements to collectively effect a series of transmission output speeds substantially in geometrical progression; speed selector means including members having different relative positions respectively corresponding to different speeds of said geometrical series, shifter means for said rate change devices and motor control elements, and control means for operation of said shifter means to shift said rate change devices and motor control elements to positions thereof effecting the speed of said series corresponding to the position of said speed selector members, the last mentioned control means including means for effecting said low speed position of said motor control elements during operation of said shifter means for shifting some of said rate change devices and for effecting another position of said motor control element following the last mentioned operation of said shifter means.

13. In a machine tool the combination of a transmission including a primary rate change device shiftable to relatively high and low speed positions thereof and other shiftable rate change means driven through said primary device, said primary device and rate change means being collectively shiftable for effecting various speed position combinations thereof, a power source for driving said transmission including a motor operable at a plurality of speeds, different of said motor speeds together with different of said speed position combinations collectively effecting a series of transmission output speeds substantially in a geometrical progression, control means for said motor including elements shiftable to different relative positions respectively for different of said motor speeds including a position for a low motor speed, speed selector means including members movable for different relative positions respectively corresponding to different speeds of said geometrical series, shifter means for said device, said rate change means and said motor control elements, control means for operation of said shifter means to effect the speed of said series corresponding to the position of said selector members in various positions of said members, and means associated with the last mentioned control means including means for effecting a simultaneous low speed position of said motor control elements and low speed position of said device during operation of said shifter means for shifting some of said other rate change means, and including means for effecting another position of said motor control elements following the last mentioned operation of said shifter means.

14. In a transmission and control mechanism the combination of a power source including a motor operable for a plurality of speeds, a plurality of shiftable rate change devices driven through said motor, motor control means comprising elements shiftable to different relative positions respectively effecting different motor speeds including relatively high and low speeds, speed control means including relatively adjustable rate selector members having various positions respectively corresponding to different speeds of a major series of output speeds comprising a high minor series and a relatively low minor series of speeds and including shifter means for effecting different speed position combinations of said rate change devices and motor control elements respectively corresponding to the different positions of said members, whereby to effect one or another of said output speeds in accordance with the member positions, a speed control device including a part shiftable to different positions respectively for operation of said shifter means to effect a speed of one of said minor series corresponding to the positions of said selector members and to effect a speed of the other minor series, and means associated with said speed control means and speed control device to effect said low speed position of said motor control elements during operation of said shifter means for shifting some of said rate change devices.

15. In a transmission and control mechanism the combination of a power source including a motor operable for a plurality of speeds, a train driven from said motor including a primary rate change device and another rate change device driven therethrough, motor control means comprising elements shiftable to different relative positions respectively effecting different motor speeds including relatively high and low speeds, speed control means including relatively adjustable members having various positions respectively corresponding to different speeds of a major series of output speeds comprising a high minor series and a relatively low minor series and including shifter means for effecting different speed position combinations of said rate change devices and motor control elements respectively corresponding to the different positions of said members, whereby to effect one or another of said output speeds in accordance with the member positions, a speed control device including a part shiftable to different positions respectively for operation of said shifter means to effect a speed of one of said minor series corresponding to the position of said members and to effect a speed of the other minor series, and means associated with said speed control means and speed control device to effect a simultaneous low speed position of said motor control elements and low speed position of said primary rate change device during operation of said shifter means for shifting said other rate change device.

16. In a transmission and control mechanism the combination of a power source including a motor operable for a plurality of speeds, a plurality of shiftable rate change devices driven through said motor, motor control means comprising elements shiftable to different relative positions respectively effecting different motor speeds including relatively high and low speeds, speed control means including relatively adjustable rate selector members having various positions respectively corresponding to different speeds of a major series of output speeds comprising a high minor series and a relatively low minor series of speeds and including shifter means for effecting different speed position combinations of said rate change devices and motor control elements respectively corresponding to the different positions of said members, whereby to effect one or another of said output speeds in accordance with the member positions, a speed control device including a part shiftable to different positions respectively for operation of said shifter means to effect a speed of one of said minor series corresponding to the positions of said selector members and to effect a speed of the other minor series, said motor control means including range selector means adjustable for selectively effecting said high or low speed positions of said motor control elements, whereby to selectively effect a relatively high or low range of said output speeds, and means associated with said shifter means to effect said low speed position of said motor control elements during operation of said shifter means while said range selector means is in an adjustment position for effecting said high motor speed.

17. In a transmission and control mechanism the combination of a power source including a motor operable for a plurality of speeds, a train driven from said motor including a primary rate change device and another rate change device driven therethrough, motor control means comprising elements shiftable to different relative positions respectively effecting different motor speeds including relatively high and low speeds, speed control means including relatively adjustable members having various positions respectively corresponding to different speeds of a major series of output speeds comprising a high minor series and a relatively low minor series and including shifter means for effecting different speed position combinations of said rate change devices and motor control elements respectively corresponding to the different positions of said members, whereby to effect one or another of said output speeds in accordance with the member positions, a speed control device including a part shiftable to different positions respectively for operation of said shifter means to effect a speed of one of said minor series corresponding to the position of said members and to effect a speed of the other minor series, said motor control means including range selector means adjustable for selectively effecting said high or low speed position of said motor control elements, whereby to selectively effect a relatively high or low range of said output speeds, and means associated with said shifter means to effect a simultaneous low speed position of said primary rate change device and low speed position of said motor control elements during operation of said shifter means for shifting said other rate change device.

18. In a transmission and control mechanism the combination of a power source including a motor operable for a plurality of speeds, a plurality of shiftable rate change devices driven through said motor, motor control means comprising elements shiftable to different relative positions respectively for different motor speeds including relatively high and low speeds, rate selector means including adjustable members having various relative positions respectively corresponding to different output speeds, shifter means operable for effecting different position combinations of said motor control elements and shiftable rate change devices respectively in the different positions of said selector members and productive of the output speed corresponding to the selector member position, a controller device having a first adjustment position in which operation of said shifter means is delayed and having a second position in which said shifter means are operative to effect one of said position combinations substantially immediately upon adjustment of the controller device, and means associated with said shifter means and motor control means to prevent operation of said shifter means on some of said rate change devices except when said motor control elements are in said position for relatively low motor speed.

19. In a transmission and control mechanism the combination of a power source including a motor operable for a plurality of speeds, a plurality of shiftable rate change devices driven through said motor, motor control means comprising elements shiftable to different relative positions respectively for different motor speeds including relatively high and low speeds, rate selector means including adjustable members having various relative positions respectively corresponding to different transmission output speeds, shifter means operable for effecting various position combinations of said motor control elements and shiftable rate change devices respectively in the different positions of said selector members and productive of the output speed corresponding to the member positions, a controller device including a portion having a first adjustment position in which said operation of said shifter means takes place substantially simultaneously with adjustment of said selector members and having a second adjustment position in which operation of said shifter means is delayed, said controller device including another portion having a normal adjustment position maintaining said delay in operation of said shifter means and having another position in which said operation of said shifter means takes place substantially immediately upon adjustment of said other portion to said other position, and means associated with said shifter means and motor control means for preventing operation of said shifter means for shifting some of said rate change devices except when said motor control elements are in said position for relatively low motor speed.

20. In a transmission and control mechanism the combination of a power source including a motor operable for a plurality of speeds, a plurality of shiftable rate change devices driven through said motor, motor control means comprising elements shiftable to different relative positions respectively for different motor speeds including relatively high and low speeds, rate selector means including adjustable members having various relative positions respectively corresponding to different transmission output speeds, shifter means operable for effecting various position combinations of said motor control elements and shiftable rate change devices respectively in the different positions of said selector members and productive of an output speed corresponding to the member position, a controller device having a first adjustment position in which said operation of said shifter means is delayed and having a second position in which said shifter means are operative substantially immediately upon adjustment of the controller device to said second position, said motor control means including range selector means adjustable for selective positioning of said motor control elements for said high or low speed position thereof, whereby the collective position combinations effected by said shifter means selectively results in a relatively high or low range of said output speeds, and means associated with said shifter means and motor control means to prevent operation of said shifter means for shifting some of said rate change devices except when said motor control elements are in said position for relatively low motor speed.

21. In a transmission and control mechanism the combination of a power source including a motor operable for a plurality of speeds, a plurality of shiftable rate change devices driven through said motor, motor control means comprising elements shiftable to different relative positions respectively for different motor speeds including relatively high and low speeds, rate selector means including adjustable members having various relative positions respectively corresponding to different transmission output speeds, shifter means operable for effecting various position combinations of said motor control elements and shiftable rate change devices respectively in the different positions of said selector members and productive of the output speed corresponding to the member position, a controller device including a portion having a first adjustment position in which said operation of said shifter means takes place substantially simultaneously with adjustment of said selector members and having a second adjustment position in which operation of said shifter means is delayed, said controller device including another portion having a normal adjustment position maintaining said delay in operation of said shifter means and having another position in which said operation of said shifter means takes place substantially immediately when said other portion is adjusted to said other position, said motor control means including range selector means adjustable for selective positioning of said motor control elements for said high or low speed position thereof, whereby the collective position combinations effected by said shifter means selectively results in a relatively high or low range of said output speeds, and means associated with said shifter means and motor control means to prevent operation of said shifters for shifting of some of said rate change devices except when said motor control elements are in said position for low motor speed.

22. In a transmission and control mechanism the combination of a power source including a motor operable for a plurality of speeds, a plurality of shiftable rate change devices driven through said motor, motor control means comprising elements shiftable to different relative positions respectively for different of said motor speeds including relatively high and low speeds, rate selector means including members having various relative adjustment positions respectively corresponding to different speeds of a major series of transmission output speeds comprising a relatively high minor series and a relatively low minor series of speeds, shifter means operable for effecting various speed position combinations of said rate change devices and motor control elements respectively corresponding to different of said selector member positions and collectively productive of said major series of speeds, a controller device having a first adjustment position in which operation of said shifter means is delayed following adjustment of said selector members from one to another position thereof and having a second adjustment position in which said shifter means are operative to effect the position combination corresponding to the last mentioned position of said rate selector members substantially immediately upon adjustment of the controller device to said second position, whereby to effect a speed of one of said minor series of speeds, controller means adjustable to different positions respectively effecting the last mentioned position combination and effecting a position combination for a speed of the other minor series of output speeds, said motor control means including range selector means adjustable for selectively effecting said high or low speed position of said motor control elements whereby to selectively effect a relatively high or low range for said series of output speeds, and means associated with said shifter means and motor control means for preventing operation of said shifter means for shifting some of said rate change devices except when said motor control elements are in a position for said relatively low motor speed.

GEORGE H. JOHNSON.